(12) United States Patent
Granato et al.

(10) Patent No.: US 9,840,160 B2
(45) Date of Patent: Dec. 12, 2017

(54) METHOD FOR ESTIMATING THE ENERGY CONSUMPTION OF A MOTOR VEHICLE

(71) Applicant: RENAULT S.A.S., Boulogne-Billancourt (FR)

(72) Inventors: Giovanni Granato, Vanves (FR); Frederic Bonnans, Montigny le Bretonneux (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 72 days.

(21) Appl. No.: 14/362,229

(22) PCT Filed: Nov. 30, 2012

(86) PCT No.: PCT/EP2012/074153
§ 371 (c)(1),
(2) Date: Jun. 30, 2014

(87) PCT Pub. No.: WO2013/079694
PCT Pub. Date: Jun. 6, 2013

(65) Prior Publication Data
US 2014/0324328 A1    Oct. 30, 2014

(30) Foreign Application Priority Data

Dec. 2, 2011 (FR) ..................... 11 61110

(51) Int. Cl.
*B60L 11/18* (2006.01)
*B60W 10/08* (2006.01)
*B60W 20/12* (2016.01)

(52) U.S. Cl.
CPC .......... *B60L 11/1861* (2013.01); *B60W 10/08* (2013.01); *B60W 20/12* (2016.01);
(Continued)

(58) Field of Classification Search
CPC .............. B60L 11/1861; B60L 2240/12; B60L 2260/54; B60W 10/08; B60W 20/104;
(Continued)

(56) References Cited

U.S. PATENT DOCUMENTS 6,314,347 B1    11/2001  Kuroda et al.
9,558,660 B1 *   1/2017  Fowe ................... G08G 1/0125
(Continued)

FOREIGN PATENT DOCUMENTS

DE    10 2007 059 120 A1    6/2009
JP         2000-76585 A       3/2000
(Continued)

OTHER PUBLICATIONS

Modeling and Forecasting Vehicular Traffic Flow as a Seasonal ARIMA Process: Theoretical Basis and Empirical Results, by Billy M. Williams and Lester A. Hoel, Journal of Transportation Engineering © ASCE / Nov./Dec. 2003.*
(Continued)

*Primary Examiner* — Redhwan K Mawari
*Assistant Examiner* — Michael Whalen
(74) *Attorney, Agent, or Firm* — Oblon, McClelland, Maier & Neustadt, L.L.P.

(57) ABSTRACT

A method for estimating energy consumption of a motor vehicle during a given journey, including: a) cutting the journey into portions of journey, b) allocating a setpoint speed to each portion of journey, as a function of at least one characteristic of the portion, c) estimating, for each portion of journey, an evolution of speed of the vehicle as a function of time, the speed being estimated as a function of at least one characteristic of the portion of journey and as a function of a predetermined driving behavior associated with the setpoint speed of the portion, to establish for a whole of the journey an estimation of the evolution of the speed of the
(Continued)

vehicle as a function of time, d) estimating the energy consumption of the vehicle during the journey, as a function of the evolution of the estimated speed.

12 Claims, 1 Drawing Sheet

(52) U.S. Cl.
CPC ....... *B60L 2240/12* (2013.01); *B60L 2260/54* (2013.01); *B60W 2520/10* (2013.01); *B60W 2530/14* (2013.01); *B60W 2550/402* (2013.01); *B60W 2720/10* (2013.01); *B60Y 2300/52* (2013.01); *Y02T 10/7005* (2013.01); *Y02T 10/705* (2013.01); *Y02T 10/7044* (2013.01); *Y02T 10/7258* (2013.01)

(58) Field of Classification Search
CPC ....... B60W 2550/402; B60W 2530/14; B60W 2520/10; B60W 2720/10; Y02T 10/705; Y02T 10/7005; Y02T 10/7044; Y02T 10/7258; B60Y 2300/52
See application file for complete search history.

(56) References Cited

U.S. PATENT DOCUMENTS

| | | | |
|---|---|---|---|
| 2009/0212994 A1 | 8/2009 | Hamza et al. | |
| 2010/0286907 A1* | 11/2010 | Hilbrandie | G01C 21/32 701/533 |
| 2011/0040438 A1 | 2/2011 | Kluge et al. | |
| 2011/0309926 A1* | 12/2011 | Eikelenberg | G01C 21/3469 340/439 |
| 2011/0313647 A1* | 12/2011 | Koebler | B60L 15/2045 701/123 |
| 2012/0016576 A1* | 1/2012 | Huang | G01C 21/3469 701/423 |
| 2012/0232783 A1* | 9/2012 | Calkins | G01C 21/3469 701/411 |
| 2013/0261966 A1* | 10/2013 | Wang | G01C 21/3469 701/533 |
| 2014/0214301 A1* | 7/2014 | Edgren | B60K 37/02 701/99 |
| 2016/0061611 A1* | 3/2016 | Meyer | G01C 21/3469 701/1 |
| 2016/0061616 A1* | 3/2016 | Meyer | G01C 21/3469 701/123 |

FOREIGN PATENT DOCUMENTS

| | | |
|---|---|---|
| JP | 2000-333305 A | 11/2000 |
| JP | 2005-98749 A | 4/2005 |
| JP | 2010-190895 A | 9/2010 |

OTHER PUBLICATIONS

International Search Report dated Dec. 11, 2013 in PCT/EP2012/074153 (with English language translation).
French Preliminary Search Report and Written Opinion dated Oct. 9, 2012 in Patent Application No. 1161110 (with English translation of categories of cited documents).
"ARMA-Modell", Wikipedia, Retrieved on Sep. 27, 2012 from URL: http://de.wikipedia.org/w/index.php?title=ARMA-Modell &oldid=950, XP007921093, Oct. 21, 2011, 4 Pages.

* cited by examiner

METHOD FOR ESTIMATING THE ENERGY CONSUMPTION OF A MOTOR VEHICLE

BACKGROUND

The present invention relates to a method for estimating the energy consumption of a motor vehicle.

In the context of estimating the mileage range of a motor vehicle, it appears necessary to be able to reliably predict the energy consumption of the vehicle over a given route.

The energy consumption can refer to an electrical consumption and/or a fuel consumption. In the case of an electric vehicle, for example, it can be the quantity of charge remaining in the battery, commonly referred to as State of Charge (SOC).

The energy consumption can be dependent on many factors. A first problem is to identify the factors that contribute the most to consumption. For example, it is known that for a vehicle with a diesel engine, the acceleration of the vehicle from standstill, driving with low gear ratios, accelerations that are too sharp, or driving at low speed are factors that have a significant effect on the fuel consumption.

SUMMARY

A known solution to determine the energy consumption consists in creating a very fine-tuned digital model of the engine which matches empirical knowledge as closely as possible. Nevertheless, even if such a model is available, the behavior of the driver is not taken into consideration.

The present invention aims to address these drawbacks.

It proposes a proposes a method for estimating the energy consumption of a vehicle which takes into account the behavior of the driver and which is both simple and reliable.

A subject of the invention is thus a method for estimating the energy consumption of a motor vehicle over a given route.

The method comprises the following steps:

a) a step for splitting the route into route portions, b) a step for allocating a set speed to each route portion, as a function of at least one characteristic of said portion, c) a step for estimating, for each route portion, the change in speed of the vehicle as a function of time, the speed being estimated as a function of at least one characteristic of the route portion and as a function of a predetermined driving behavior associated with the set speed of said portion, so as to establish for the whole of the route an estimate of the change in speed of the vehicle as a function of time, d) a step for estimating the energy consumption of the vehicle over the route, as a function of the change in the estimated speed.

The step for splitting the route into route portions, the step for allocating a set speed to each route portion and the establishment of a predetermined driving behavior can be provided by the navigation system of the vehicle.

The step for estimating the change in speed can be carried out using an ARMA (Autoregressive-Moving-Average) model.

The step for estimating the change in speed of the vehicle as a function of time can thus be obtained by working out the average of several estimates.

The ARMA model can change in real time as a function of the behavior of the driver.

The characteristic or characteristics of the route portion are the type of route, the length of the route, the number of traffic lights and the number of junctions.

The estimated values of the change in speed of the vehicle can be filtered using a low-pass filter.

The energy consumption can be an electrical consumption and/or a fuel consumption.

BRIEF DESCRIPTION OF THE DRAWINGS

Other features and advantages of the present invention will become clearer upon reading the following description, given by way of illustrative and non-limiting example, of a method according to the invention, the description being given with reference to the accompanying drawings in which.

DETAILED DESCRIPTION

The method according to the invention provides for taking into account the factors related to the driving style of the driver and the factors related to the characteristics of the route to be traveled. The method can in particular provide for taking these factors into account by means of two items of information: past driving data of the driver and information about the route from the navigation system of the vehicle (referred to as "NAV").

A speed profile (speed values as a function of the vehicle position at each point on the route) is generated for a given route, for example as a function of the route type associated with each of the portions. From this speed profile, a quite simple battery model is implemented which provides for describing, for example, the change in SOC by knowing the speed of the vehicle and the acceleration.

Figure 1:
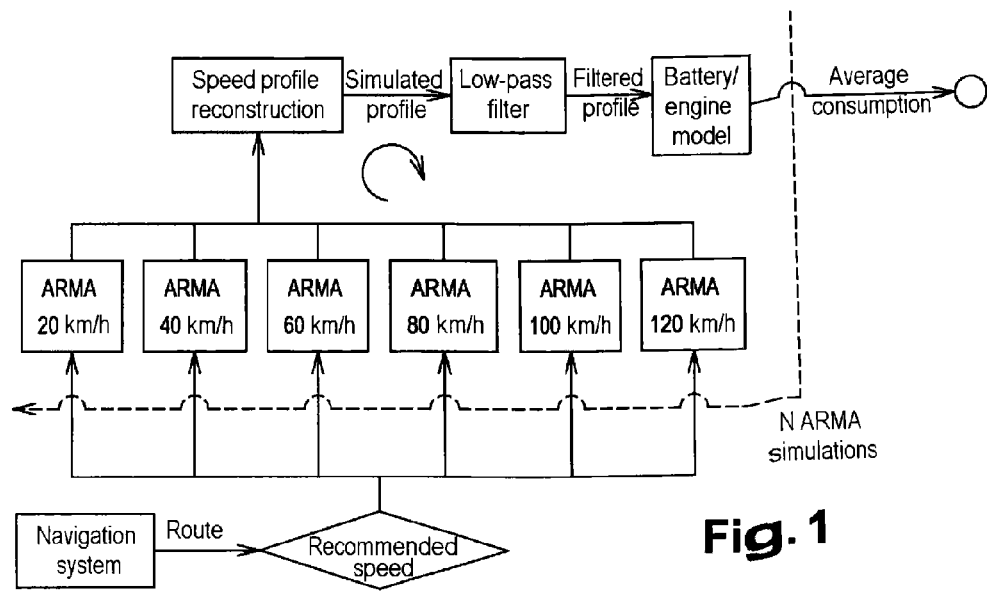
FIG. 1 is a diagram to aid the comprehension of the method.

An example of such a generation of this profile is shown schematically in FIG. 1. The following steps are carried out:

1) The driver enters a destination in the NAV. The NAV gives the driver a route to this destination. In the NAV, this route is split into route segments with which there are associated parameters such as for example the type of route, a suggested speed, the length of the segment, the indication according to which the segment includes a traffic light or a junction.

2) With this information, autoregressive-moving-average models (ARMA models) are hence used, providing for generating a speed profile which takes into account the actual characteristics of the driving style (sharp acceleration/rapid movement of the accelerator pedal, high/low gear, parameters having an effect on the energy consumption) of the driver. The ARMA models are stochastic models, i.e. they randomly generate a speed profile. Thus, if two speed profiles are generated with the same ARMA model, these profiles will be different. The model is made up of two parts: an autoregressive (AR) part and a moving-average part (MA). The model is generally denoted by ARMA(p, q) where p is the order of the AR part and q the order of the MA part.

Figure 2:
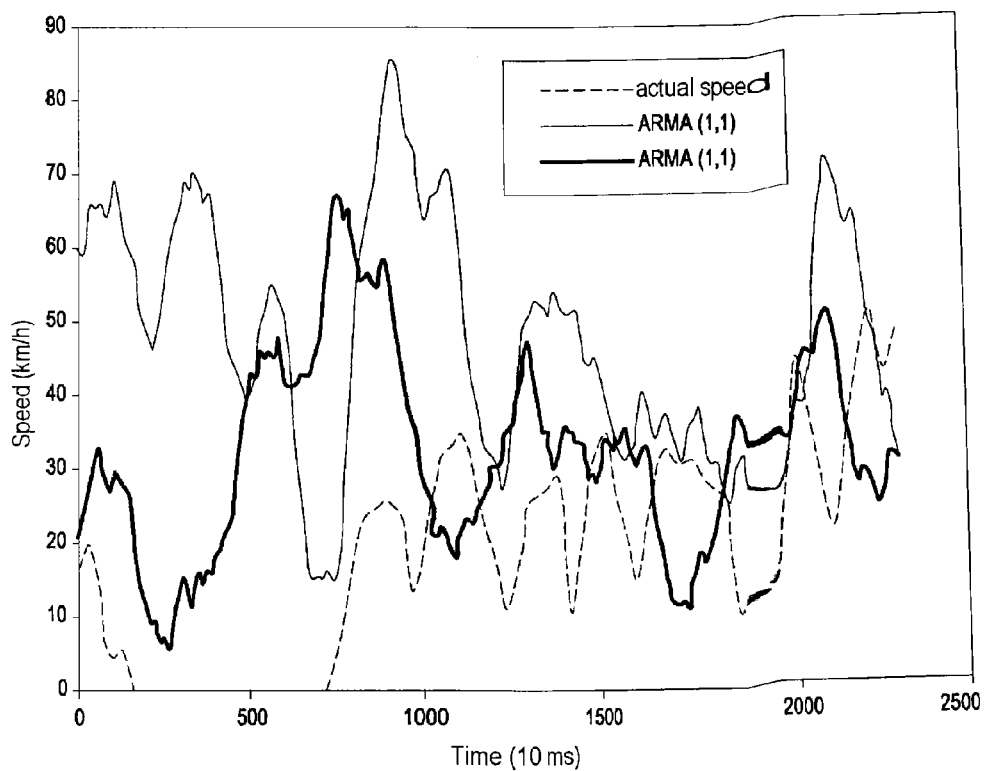
FIG. 2 is a diagram comparing the speed changes estimated using the method and a measured speed change.

FIG. 2 illustrates two speed profiles generated by the same ARMA model for the same route and the profile of the actual measured speed.

3) The speed profile is filtered with a low-pass filter in order to exclude unrealistic accelerations.

4) Once the speed profile is filtered, it is possible to apply the model for the change in the SOC in order to calculate the quantity of charge that the driver would have consumed if this speed profile had been followed exactly (within the error bounds for the battery model).

5) Steps 2, 3 and 4 are repeated a large number N of times (200 times, for example) in order to obtain an average SOC consumption value, as well as an associated standard deviation.

The method can in particular comprise the following steps:
  inputting of a destination into the navigation system,
  generation of a route by the navigation system,
  sending of data for the route to the off-vehicle server,
  segmentation of the route by the off-vehicle server and characterization of these segments,
  generation (computation) of speed profiles of each of the segments according to one of the ARMA models set up in the memory,
  filtering of the results using a low-pass filter,
  associating of each of the speeds estimated by the ARMA model with the SOC, and
  repetition of the last three steps.

The following part of the description is devoted to the detail of the method for constructing the ARMA models.

The ARMA models are conventional models which model the future terms of a time series as being a linear combination of past terms plus a random innovation.

Let y_t be the vehicle speed at the instant t. It can be imagined that, given the speed y_t, the speed of the vehicle in the next instant t+1 is predicted by the previous speed value plus a random term:

$$y_{t+1} = a y_t + b e_{t+1}$$

where a and b are real constants and the term e_t+1 is a random variable called the innovation, otherwise referred to as strict white noise, i.e. having a zero mean and unit variance.

In this case this is an ARMA(1, 1) model. More generally, an ARMA(p, q) model considers that the speed at y_t+1 is a linear combination of p previous speeds and of q innovation terms:

$$y_{t+1} = \sum_{i=1}^{p} a_i y_{t-i} + \sum_{j=1}^{q} b_j e_{t-j+1}$$

Hereinafter, the ARMA(1, 1) model is used to explain the procedure for identifying the coefficients a and b, this being easily extended to identify the coefficients a_0, a_1, ..., a_p and b_0, ..., b_q.

To identify the ARMA(1, 1) model, a database with a sequence of values Y_n=(y_1, y_2, ..., y_n) is available. These values correspond to speed values of the driver which have been recorded beforehand.

It is possible to make sure that this series Y n is centered, i.e. has a zero mean. Thus:

$$\text{Var}(y_{t+1}) = E(y_{t+1}^2) = \sigma^2 = a^2 \sigma^2 + b^2$$

where the functions E(.) and Var(.) denote the expectation and the variance, respectively, of the variables.

It hence follows that:

$$b^2 = \sigma^2(1-a^2)$$

The condition |a|<1 must be verified to ensure the stability of the model. Moreover:

$$\gamma(1) = E(y_t y_{t+1}) = a E(y_t^2) = a \sigma^2$$

and therefore:

$$a = \frac{\gamma(1)}{\sigma^2}$$

The values of $\sigma^2$ and $\gamma(1)$ can be estimated via the values Y_n. The values of a and b are thus obtained.

The identification of an ARMA model by the historical data of a driver (or a class of drivers, or the drivers of a certain vehicle) provides the main aspect of the information about the driving style of the driver.

The characteristics of the route also affect the consumption. This is why it is possible to identify several ARMA models, each model being associated with a set of characteristics of the route segment. In our case, the speed suggested by the NAV to the driver can be used. Indeed, the NAV can propose six different speed values to the driver: 20, 40, 60, 80, 100 and 120 km/h.

Since each segment of the route is associated with one of these values, six different ARMA models can be identified: ARMA20, ARMA40, ARMA60, ARMA80, ARMA100 and ARMA120. Each ARMA model uses, for identifying its coefficients, a subset of the speed data history. For example, the subset Y_n^20 contains all the speed values which have been obtained when the driver passed through a segment associated with a suggested speed of 20 km/h. The same applies for the other models.

The method according to the invention is particularly reliable. For a route of around 27.4 km, the SOC is estimated with an average precision of 1.8% of the value obtained from the measured speeds. It is also observed that when the order of the ARMA models is increased, there is an increase in performance: for the tested models ARMA(1, 2) and ARMA(2, 1), the difference from the final value of the SOC does not exceed 1.7%.

It is possible to use higher order ARMA models. Indeed, an increase in the order of the model does not slow down the simulation step. It is the step for identifying the models which turns out to be more costly. However, since this step is carried out off-line, it can be advantageous to use models with a higher order.

A large number of simulations can be necessary in order to make sure that the results are pertinent. This number of simulations, before being able to display a reliable estimate of the consumption, is dependent on the driving style of the driver. The more regular the driving style, the more representative the ARMA models will be for the same number of simulations.

The integration of exogenous parameters other than the speed recommended by the NAV can also be considered, such as for example weather conditions or traffic conditions.

The method according to the invention is used to predict the energy consumption of the vehicle over a given route. This estimated consumption can be used, for example, to estimate the range of the vehicle. Provision can thus be made for trips to recharge points if that turns out to be necessary.

The means for implementing the method according to the invention can comprise:
  a vehicle equipped with:
    a navigation system,
    a communication module,
    a network linking the navigation system and the communication module, and
    a module for determining the level of load of the fuel tank or charge of the electricity source, a remote or off-vehicle server comprising:
computation means,
memory means, and
a communication module.

The invention claimed is:

1. A method for estimating energy consumption of a motor vehicle over a given route, comprising:
   (a) splitting the route into route portions;
   (b) allocating a plurality of set speeds to each route portion, as a function of at least one characteristic of the route portion;
   (c) estimating, via processing circuitry of a navigation system and for each route portion, a speed profile as a function of at least one characteristic of a driving style of a driver of the motor vehicle and the plurality of set speeds of the route portion, to establish for each route portion an estimate of each speed profile as a function of time, the speed profile being generated via a combination of a plurality of autoregressive-moving-average models (ARMA), wherein each ARMA model of the plurality of ARMA models includes the at least one characteristic of a driving style of a driver of the motor and a respective different set speed of the plurality of speeds;
   (d) estimating the energy consumption of the vehicle over the given route, as a function of an average of the estimate of the speed profiles;
   (e) calculating a range of the motor vehicle over the given route based on the estimated energy consumption; and
   (f) communicating, via the navigation system, the range of the motor vehicle.

2. The method as claimed in claim 1, wherein the splitting the route into route portions, the allocating the set speeds to each route portion, and establishment of the speed profiles of the driving style are provided by the navigation system.

3. The method as claimed in claim 2, wherein the autoregressive-moving-average models change in real time as a function of driving style of the driver of the motor vehicle.

4. The method as claimed in claim 1, wherein the at least one characteristic of the route portions includes at least one of a type of route, a length of the route, a number of traffic lights, and a number of junctions.

5. The method as claimed in claim 1, wherein the estimated speed profile is filtered using a low-pass filter.

6. The method as claimed in claim 1, wherein the energy consumption is an electrical consumption and/or a fuel consumption.

7. The method as claimed in claim 1, wherein the driving style of the driver of the motor vehicle is of a single driver and includes past driving style data.

8. The method as claimed in claim 1, wherein the driving style of the driver of the motor vehicle is of a class of drivers and includes past driving style data.

9. The method as claimed in claim 1, wherein the driving style of the driver of the motor vehicle is of drivers of a predetermined vehicle and includes past driving style data.

10. The method as claimed in claim 1, wherein the at least one characteristic of driving style includes at least one of sharp acceleration and deceleration, rapid movement of the accelerator pedal, and usage of high versus low gears.

11. An apparatus for estimating energy consumption of a motor vehicle over a given route, comprising:
    proessing circuitry configured to
    (a) split the route into route portions;
    (b) allocate a plurality of set speeds to each route portion, as a function of at least one characteristic of the route portion;
    (c) estimate, via a navigation system and for each route portion, a speed profile as a function of at least one characteristic of a driving style of a driver of the motor vehicle and the plurality of set speeds of the route portion, to establish for each route portion an estimate of the speed profile as a function of time, each speed profile being generated via a combination of a plurality of autoregressive-moving-average models (ARMA), wherein each ARMA model of the plurality of ARMA models includes the at least one characteristic of a driving style of a driver of the motor and a respective different set speed of the plurality of speeds; and
    (d) estimate the energy consumption of the vehicle over the given route, as a function of an average of the estimate of the speed profiles;
    (e) calculating a range of the motor vehicle over the given route based on the estimated energy consumption for each route portion; and
    (f) communicating, via the navigation system, the range of the motor vehicle.

12. A non-transitory computer-readable medium having stored thereon instructions which when executed by the computer cause the computer to perform a method for estimating energy consumption of a motor vehicle over a given route, comprising:
    (a) splitting the route into route portions;
    (b) allocating a plurality of set speeds to each route portion, as a function of at least one characteristic of the route portion;
    (c) estimating, via a navigation system and for each route portion, a speed profile as a function of at least one characteristic of a driving style of a driver of the motor vehicle and the plurality of set speeds of the route portion, to establish for each route portion an estimate of the speed profile as a function of time, each speed profile being generated via a combination of a plurality of autoregressive-moving-average models (ARMA), wherein each ARMA model of the plurality of ARMA models includes the at least one characteristic of a driving style of a driver of the motor and a respective different set speed of the plurality of speeds; and
    (d) estimating the energy consumption of the vehicle over the given route, as a function of an average of the estimate of the speed profiles;
    (e) calculating a range of the motor vehicle over the given route based on the estimated energy consumption for each route portion; and
    (f) communicating, via the navigation system, the range of the motor vehicle.

* * * * *